(12) United States Patent
Alcock et al.

(10) Patent No.: US 7,006,724 B2
(45) Date of Patent: Feb. 28, 2006

(54) OPTICAL FIBERS

(75) Inventors: Ian Peter Alcock, Petersfield (GB); David James Pointer, Southampton (GB)

(73) Assignee: Point Source Limited, (GB)

( * ) Notice: Subject to any disclaimer, the term of this patent is extended or adjusted under 35 U.S.C. 154(b) by 264 days.

(21) Appl. No.: 10/411,228

(22) Filed: Apr. 11, 2003

(65) Prior Publication Data

(30) Foreign Application Priority Data

Apr. 12, 2002 (GB) .................................. 0208497

(51) Int. Cl.
G02B 6/24 (2006.01)

(52) U.S. Cl. ............................ 385/27; 385/39; 385/43; 65/385

(58) Field of Classification Search ................ 385/100, 385/123, 141, 146, 27, 39, 43; 65/376, 385, 65/402, 403
See application file for complete search history.

(56) References Cited

U.S. PATENT DOCUMENTS

| | | | |
|---|---|---|---|
| 5,123,581 A | 6/1992 | Curtis et al. | |
| 5,623,569 A | 4/1997 | Musk | |
| 5,668,899 A | 9/1997 | Jadrich | |
| 5,734,765 A | 3/1998 | Artjushenko et al. | |
| 5,953,477 A * | 9/1999 | Wach et al. | 385/115 |
| 6,094,515 A * | 7/2000 | Miki et al. | 385/31 |
| 6,276,843 B1 | 8/2001 | Alcock et al. | |
| 6,792,178 B1 * | 9/2004 | Zhou | 385/31 |
| 2003/0039445 A1 | 2/2003 | Blank et al. | |
| 2004/0114878 A1 * | 6/2004 | Yamada et al. | 385/88 |

FOREIGN PATENT DOCUMENTS

| | | |
|---|---|---|
| EP | 0 023 834 A2 | 1/1981 |
| EP | 0 177 928 A1 | 4/1986 |
| EP | 0 357 132 A2 | 3/1990 |
| EP | 0689072 | 12/1995 |
| EP | 0 756 243 A2 | 1/1997 |
| EP | 0 822 430 A3 | 4/1999 |
| EP | 0 918 238 A1 | 5/1999 |
| EP | 1 085 354 A2 | 3/2001 |
| GB | 2 245 986 A | 1/1992 |
| GB | 2 257 264 A | 1/1993 |

(Continued)

OTHER PUBLICATIONS

D. Pointer, "Prefocused optics simplify fiberoptic laser-beam delivery," Laser Focus World, Mar. 1990.

(Continued)

*Primary Examiner*—John D. Lee
*Assistant Examiner*—James D. Stein
(74) *Attorney, Agent, or Firm*—Vierra Magen Marcus Harmon & DeNiro LLP

(57) ABSTRACT

The end face of an optical fiber 11 is polished at an angle to alter the cross-sectional dimensions of a light beam exiting the fiber through that end face to alter the cross-sectional circularity of the light beam after it has exited the fiber as compared to its cross-sectional circularity when it is in the fiber. For example, to increase the circularity of an exiting light beam, the angled fiber end face can be aligned such that the major axis of the sloping fiber end face is aligned with the major cross-sectional axis of the light beam in the fiber (i.e. perpendicular to the minor cross-sectional axis of the light beam in the fiber). This has the effect of reducing the length of the major cross-sectional axis of the light beam once it has exited the fiber.

28 Claims, 4 Drawing Sheets

FOREIGN PATENT DOCUMENTS

| | | |
|---|---|---|
| GB | 2334 344 A | 8/1999 |
| JP | 59060411 | 4/1984 |
| JP | 60191211 | 9/1985 |
| WO | WO 01/55764 | 8/2001 |

OTHER PUBLICATIONS

D. Pointer, "Laser Beam Delivery In Industry," EuroPhotonics, Dec./Jan. 1997, pp. 30-31.

* cited by examiner

OPTICAL FIBERS

The present invention relates to optical fibres, and in particular to the processing of the end face of an optical fibre where the fibre terminates to achieve desired properties in relation to or in a light beam entering or exiting the optical fibre.

One of the properties of a light beam carried by an optical fibre is the degree of cross-sectional circularity of the light beam. The circularity of a light beam is typically defined with reference to the ratio of the minor cross-sectional axis of the light beam to the major cross-sectional axis of the beam. A circular beam cross-section would have equal major and minor axes and a "circularity" of 100%. Light beams carried by optical fibres are often described as having either circular or non-circular modes. The cross-section of a non-circular mode light beam typically has an oval or elliptical profile with a major and minor axis and such light beams can occur with varying degrees of non-circularity.

There are a number of causes of non-circularity of light beams in optical fibres. Primarily, the non-circularity of a light beam is a result of an asymmetry in the physical and/or optical properties across the core of an optical fibre, i.e. the properties of the optical fibre core differing in two orthogonal planes across the cross-section of the core. For example, an optical fibre that has a core of an oval or elliptical shape in cross-section, i.e. has different dimensions in two orthogonal planes, will cause any light beam it carries to have a non-circular, typically oval or elliptical, cross-section. Furthermore, the light beam emitted from the fibre will retain the non-circular shape imposed on the beam by the fibre. Non-circular cross-sectioned light beams can also result from an asymmetry in the relative refractive indices of the optical fibre core and the surrounding cladding in two orthogonal planes. This again results in an optical fibre which causes any light beam it carries to adopt a non-circular cross-section.

The above types of asymmetry in the physical and/or optical properties of optical fibres usually result from physical stresses that are applied to the optical fibre during its manufacture. The placing of an optical fibre under such stresses may be unintentional, say as a result of poor process control during manufacture. Alternatively, it is sometimes the case that optical fibres are deliberately placed under such stresses during manufacture in order to give the optical fibre particular optical properties. For example, some optical fibres are placed under stress to induce birefringence in the fibre which allows the light in the fibre to maintain polarisation. A consequence of this, however, is that such optical fibres can suffer from "non-circular" cores to various degrees.

Whilst, in some applications, the circularity of the light beam emitted from an optical fibre may be of little consequence, it is often desired that light beams emitted by optical fibres have a high degree of circularity. For example, in the field of reprographics there are applications of optical fibres in which a cross-sectional circularity value of an emitted light beam of say less than 85%–90% (defined, as discussed above, by the ratio of the minor and major dimensions of the light beam cross-section) cannot be tolerated. Consequently, in such more demanding applications, the types of optical fibre that can be used may be limited.

It can therefore be desirable to provide means to increase the circularity of a light beam exiting an optical fibre.

It may also be desirable in some applications to be able to decrease the circularity of a light beam exiting an optical fibre.

From a first aspect, the present invention provides an optical fibre comprising:

a fibre core which terminates at an end face;

wherein the or a terminating end face of the fibre core is generally planar and is disposed at an angle to a plane perpendicular to the longitudinal axis of the fibre;

and wherein the angled fibre end face is orientated such that the cross-sectional circularity of a light beam after exiting the core of the fibre through that end face will be altered as compared to the cross-sectional circularity of the light beam when it is in the fibre.

The invention also provides a method of processing an optical fibre to alter the circularity of a light beam exiting the fibre.

From a second aspect, the present invention provides a method of processing an optical fibre, comprising determining the circularity of a light beam exiting the optical fibre and processing an end face of the optical fibre core such that it is arranged at an angle to a plane perpendicular to the longitudinal axis of the fibre on the basis of the determined circularity of a light beam exiting the fibre to alter the circularity of a light beam exiting the fibre.

In the present invention, the end face of an optical fibre is arranged at an angle relative to a plane perpendicular to the longitudinal axis of the fibre. The Applicants have recognised that by providing an angled end face of the fibre core at an end of an optical fibre, the cross-sectional circularity of the light beam exiting the optical fibre through the angled end face can be altered, i.e. increased or decreased. Therefore, by arranging the fibre end face at an appropriate angle, the circularity of the exiting light beam can be altered as desired to suit a particular application.

It is believed that the effect of angling the end face of an optical fibre on the cross-sectional shape of an exiting light beam can be explained by considering how the light beam is refracted at the glass:air interface at the end of the optical fibre. The end face of a conventional optical fibre typically lies in a plane perpendicular to the longitudinal axis of the optical fibre. If the light beam within such a fibre is considered to act as a simple ray of light which passes along the longitudinal axis of the optical fibre, then in a conventional optical fibre, this light ray will be perpendicular to the glass:air interface defined by the end face of the fibre. The angle of incidence of the ray of light at the glass:air interface will therefore be zero. In accordance with Snell's law, the angle of refraction will also be zero and the ray of light will pass through the end face of the fibre without deviation.

By arranging the optical fibre end face such that it lies at an angle to a plane perpendicular to the longitudinal axis of the fibre, a ray of light which passes along the longitudinal axis of the optical fibre is no longer perpendicular to the glass:air interface. Instead, the ray of light strikes the interface at an angle and the ray is refracted in accordance with Snell's law:

$$n \times \sin(i) = \sin(r)$$

where:

i and r are the respective angles of incidence and refraction of the light ray, and n is the relative index of refraction of the two media.

This refraction firstly causes the light ray to deviate from its path (such that the optical axis of the exiting light beam is at an angle (and not parallel) to the longitudinal (optical) axis of the fibre). Furthermore, when viewed along the optical axis of the emitted light beam, the cross-sectional shape of the emitted light beam is changed relative to the cross-sectional shape of the beam in the fibre. In this way, the cross-sectional shape (and hence circularity) of the beam is altered as it exits the fibre.

In practice, as will be explained in more detail below, the effect of the refraction caused by the angled fibre end face is that the cross-sectional dimension (axis) of the emitted light beam that is effectively perpendicular to the minor dimension (axis) of the cross-section of the angled fibre end face is reduced relative to its length when the beam is in the fibre, thereby altering the circularity of the exiting beam as compared to the beam when it is in the fibre.

Thus, by appropriate alignment of the slope of the angled fibre end face, say with respect to a non-symmetrical optical fibre core or light beam carried by the fibre, and by an appropriate choice of end face angle, the refraction of the light beam can be tailored to make the emitted light beam more or less circular as desired. For example, to make the emitted light beam more circular than the beam carried by the fibre, the minor axis of the angled fibre end face should be aligned with the minor axis of the beam cross-section (i.e. perpendicular to its longitudinal axis) in the fibre (as then the major axis of the beam cross-section in the fibre will be relatively reduced when the beam exits the fibre), and vice-versa. Thus in preferred embodiments at least, the invention will comprise processing the end face of the optical fibre to cause it to lie at an angle to a plane perpendicular to the longitudinal axis of the fibre, which angle is determined on the basis of the determined circularity of a light beam exiting the fibre and so as to alter the circularity of the light beam when it exits the fibre through that end face.

Thus, from a further aspect, the present invention provides a method of adjusting the circularity of a light beam emitted from an optical fibre, comprising:

determining the natural degree of cross-sectional circularity of a light beam carried by the optical fibre;

determining the degree of slope of the end face of the fibre core required to obtain a desired degree of cross-sectional circularity in a light beam emitted from the optical fibre; and processing the end face of the optical fibre core to obtain the determined degree of slope of the end face and the desired degree of cross-sectional circularity in a light beam emitted from the fibre.

One application of the present invention is to increase the cross-sectional circularity of a light beam exiting from an optical fibre that carries a non-circular light beam (such as a naturally oval mode optical fibre), i.e. to make the cross-section of the emitted beam more circular than the cross-section of the beam when it is in the fibre. This would allow, for example, a naturally non-circular beam carrying optical fibre to have the circularity of its emitted light beam increased, say to make it suitable for applications such as reprographics.

Therefore, according to a further aspect, the present invention provides an optical fibre comprising:

a fibre core which will carry a non-circular cross-sectioned light beam and which terminates at an end face;

wherein the end face of the fibre core is generally planar and is disposed at an angle to a plane perpendicular to the longitudinal axis of the fibre;

and wherein the minor axis of the sloping angled end face of the optical fibre is generally aligned with the minor cross-sectional axis of the non-circular light beam that will be carried by the fibre.

From a further aspect, the present invention provides a method of processing an optical fibre, comprising: determining the circularity of a light beam exiting the optical fibre and processing an end face of the optical fibre at an angle to a plane perpendicular to the longitudinal axis of the fibre on the basis of the determined circularity to increase the cross-sectional circularity of a light beam exiting the fibre as compared to the cross-sectional circularity of the light beam when it is in the fibre.

In the above aspect and embodiment of the invention, the minor axis of the cross-section (slope) of the end face of the fibre does not necessarily need to be perfectly aligned (parallel to) with the minor axis of the non-circular (typically oval) light beam in the fibre, since improvements can be made to the circularity of the exiting light beam with the slope aligned in other generally similar orientations. It is however preferred that the minor axis of the sloping end face of the fibre core is aligned with (and substantially parallel to) the minor axis of the non-circular light beam in the fibre, as that increases the degree of cross-sectional circularity of the exiting light beam (when viewed along its optical axis).

In these arrangements, the degree of non-circularity of the light beam in the fibre may be determined as desired, e.g. experimentally, or calculated, or may in fact be known for the particular type of optical fibre used. The desired slope of the end face can then be determined (again e.g. experimentally or calculated) to produce an exiting light beam of a desired circularity.

Where it is intended to increase the circularity of a non-circular light beam, it has been found that a preferred angle of slope of the end face of the optical fibre is at least 15 degrees when measured with respect to a plane perpendicular to the longitudinal axis of the optical fibre.

From a further aspect therefore, the present invention provides an optical fibre comprising:

a fibre core which terminates at an end face;

wherein the end face of the fibre core is generally planar and is disposed at an angle greater than 15 degrees relative to a plane perpendicular to the longitudinal axis of the fibre.

From a further aspect, the present invention provides a method of processing an optical fibre wherein the circularity of a light beam exiting an optical fibre is determined and an end face of the optical fibre is processed so as to lie at an angle greater than 15 degrees relative to a plane perpendicular to the longitudinal axis of the fibre to alter the circularity of a light beam exiting the fibre.

Preferably the end face of the optical fibre lies at an angle that is greater than 20° and more preferably greater than 25° relative to a plane perpendicular to the longitudinal axis of the fibre. It is also preferred that the end face of the optical fibre lies at an angle that is less than 45°, most preferably less than 40°, relative to a plane perpendicular to the longitudinal axis of the fibre. Thus, preferably, the end face of the optical fibre is arranged at an angle in the region of 15 to 45 degrees relative to a plane perpendicular to the longitudinal axis of the fibre. More preferably, the end face is angled at 20 to 35 degrees, and most preferably at 25 to 30 degrees.

The present invention can also be used to reduce the circularity of the light beam exiting from an optical fibre that carries a non-circular beam (such as a naturally non-circular, elliptical mode optical fibre), i.e. to make the cross-section of the emitted beam less circular than the cross-section of the beam when it is in the fibre. In this arrangement the major axis of the angled fibre end face should be generally aligned with the minor cross-sectional (i.e. perpendicular to the longitudinal axis) axis of the non-circular light beam in the fibre to increase the non-circularity (since the effect of the refraction as the beam exits the fibre will then be to further relatively reduce the length of the beam's minor cross-sectional axis).

Therefore, according to a further aspect, the present invention provides an optical fibre comprising:

a fibre core which will carry a non-circular cross-sectioned light beam and which terminates at an end face;

wherein the end face of the fibre core is generally planar and is disposed at an angle to a plane perpendicular to the longitudinal axis of the fibre;

and wherein the major axis of the sloping angled end face of the optical fibre core is generally aligned with the minor cross-sectional axis of the non-circular light beam that will be carried by the fibre.

From a further aspect, the present invention provides a method of processing an optical fibre, comprising: determining the circularity of a light beam exiting the optical fibre and processing an end face of the optical fibre core such that it lies at an angle to a plane perpendicular to the longitudinal axis of the fibre on the basis of the determined circularity to decrease the cross-sectional circularity of a light beam exiting the fibre as compared to the cross-sectional circularity of the light beam when it is in the fibre.

In these arrangements, as the major axis of the slope of the end face of the fibre is aligned with the minor cross-sectional axis of the non-circular light beam carried by the fibre, the emitted light beam (when viewed along its optical axis) is reduced along this minor axis and thus is made increasingly oval and less circular in cross-section. Again, it may not be necessary for the major axis of the sloping fibre end face to be perfectly aligned with the minor cross-sectional axis of the non-circular light beam carried by the fibre since the circularity of the light beam can be decreased with the sloping fibre end face aligned in other similar orientations. It is however preferred that the major axis of the end face is accurately aligned with (and substantially parallel to) the minor axis of the non-circular light beam carried by the fibre as that achieves a more significant effect on the circularity of the emitted light beam.

Again, in these arrangements, the degree of non-circularity of the light beam in the fibre may be determined as desired, e.g. experimentally or calculated, or may in fact be known for the particular type of optical fibre used. The desired slope of the end face can then be determined (again e.g., experimentally or calculated) to produce an exiting light beam of a desired cross-sectional circularity.

The present invention may also be used to produce a less circular light beam from an optical fibre that carries a circular light beam, such as a naturally circular mode optical fibre, by arranging the end face of the optical fibre at an appropriate angle. In this case it is not necessary to align the slope of the end face of the fibre with respect to any axis of the light beam or fibre, as any orientation of the sloped fibre end face will increase the non-circularity of the exiting light beam. The extent of non-circularity obtained can be varied by varying the angle of the end face with respect to a plane perpendicular to the longitudinal axis of the optical fibre.

Therefore, according to yet a further aspect, the present invention provides an optical fibre comprising:

a fibre core which will carry a substantially circular cross-sectioned light beam and which terminates at an end face;

wherein the end face of the fibre core is generally planar and is disposed at an angle to a plane perpendicular to the longitudinal axis of the fibre, thereby decreasing the cross-sectional circularity of a light beam exiting the fibre as compared to the cross-sectional circularity of the light beam when it is in the fibre.

From a further aspect, the present invention provides a method of processing an optical fibre, wherein an end face of the optical fibre is processed such that it lies at an angle to a plane perpendicular to the longitudinal axis of the fibre to decrease the cross-sectional circularity of a light beam exiting the fibre relative to the cross-sectional circularity of the light beam when it is in the fibre.

Although the present invention has been described primarily with reference to the effects on a light beam exiting an optical fibre, it will be appreciated by those skilled in the art that corresponding effects will occur for a light beam entering an optical fibre, i.e. an angled fibre end face will cause refraction to alter the cross-sectional beam shape as it enters the fibre (i.e. when comparing the beam in the fibre to the beam before it enters the fibre). Thus the present invention can also be used to change the cross-sectional shape of an incoming light beam as it enters an optical fibre, by processing the entry end face of the fibre such that it lies at an appropriate angle. This could be used, for example, to allow the incoming light beam to better "match" the cross-section the light beam will be forced to adopt in the fibre, so as to, for example, couple more efficiently particular light beam shapes into optical fibres whose natural "beam shape" does not match the incoming light beam.

The present invention can also accordingly be used to create an optical fibre which emits (and accepts more efficiently) a non-circular beam at one end and a circular beam at the other end. This could be done, for example, by processing the ends of the fibre at different angles, one to provide a more circular output and one to provide a less circular output. The actual angles used will, of course, depend on the beam shape carried by the fibre, but could, for example, comprise one end face substantially perpendicular to the longitudinal axis of the fibre and the other end face at a different, sloping, angle.

An example of an application of such an optical fibre would be to couple more efficiently a non-circular, e.g. oval light beam, such as are generated by devices such as semi-conductor laser diodes, into an optical fibre (since the non-circular light beam accepting end of the fibre will better match the cross-section of the entering light beam and thereby reduce coupling losses and increase coupling efficiency) and yet still provide a circular output light beam from the fibre end that emits a more circular beam.

Similarly, the invention may be used to provide an elliptical output beam from an optical fibre but maintain a circular input to the fibre, say when coupling light from a laser, such as a HeNe laser, that provides a more circular light beam. Matching the circular input beam "shape" of the optical fibre to the circular cross-sectional beam produced by the laser helps to maintain efficient transmission (coupling) of the light from the laser into the fibre (i.e. reduce coupling losses).

Thus, from a further aspect, the present invention provides an optical fibre comprising:

a fibre core which terminates at one end at a first generally planar end face and at the other end at a second generally planar end face; wherein the first end face is disposed at a first angle to a plane perpendicular to the longitudinal axis of the fibre, and the second end face is disposed at a second angle to a plane perpendicular to the longitudinal axis of the fibre.

In this aspect and embodiments of the invention, the first and second angles could be the same, or could differ. One of the end faces could be substantially perpendicular to the longitudinal axis of the fibre. The major axes of the end faces could be parallel, or not parallel. In one preferred embodiment the major axes of the end faces are substantially parallel. In another preferred embodiment, the major axes of the end faces are substantially perpendicular to each other. The actual angles used and the orientation of the end faces will depend, as discussed above and as will be appreciated by those skilled in the art, on, for example, the exact nature of the fibre and its intended application.

From a further aspect, the present invention provides a method of processing an optical fibre wherein the ends of the fibre core are processed to lie at angles such that the optical fibre can provide a non-circular cross-sectioned light beam output from one end of the fibre and a substantially circular cross-sectioned light beam output from the other end of the fibre.

The present invention also provides a method of processing an optical fibre wherein the ends of the fibre core are processed to lie at angles such that the optical fibre can provide a substantially circular cross-sectioned light beam output from one end of the fibre and a non-circular cross-sectioned light beam output from the other end of the fibre.

It will be appreciated by those skilled in the art that in the present invention, it is, strictly speaking, only the optical fibre core that carries the light beam that needs to be arranged at an appropriate angle to affect the circularity of the exiting light beam. Thus the invention extends to arrangements where only the fibre core is so angled. However, it is believed that in practice the entire fibre end face (e.g. core and cladding) will be angled for convenience.

It will also be appreciated that the generally planar end faces of the fibre (or fibre core) while not necessarily having to be perfectly planar will in practice be at least substantially planar and most preferably planar so far as manufacturing tolerances allow.

The way that the end face or faces of the fibre or fibre core is processed to cause it to lie at the appropriate angle can be selected as desired. Thus, for example, the end of the fibre or fibre core could be polished at the relevant angle, or other techniques known, e.g., for glass or ceramics processing, such as cleaving, using a laser (e.g. an Infra-Red or Ultra-violet laser) to sculpt the end of the fibre, or ultrasonic machining of the fibre end, could be used. The processing should, as discussed above, provide a generally planar end face to the fibre or fibre core.

The present invention is particularly applicable to optical fibres used in a regime where the fibre only supports a single mode (which can then be referred to as the fundamental mode). For most fibres this is a mode that has a beam profile that closely matches a Gaussian profile. Such fibres can be referred to as having a non-circular fundamental mode (where the beam is naturally non-circular when it exits the fibre (absent, e.g., the fibre end processing of the present invention), or a circular fundamental mode, as appropriate. Where a single mode is being propagated in a fibre, then if the fibre has asymmetric properties (e.g. in terms of its core or refractive indices) as discussed above, the beam throughout the fibre will be non-circular, as will the beam emerging from the fibre, regardless of the beam's initial circularity before entering the fibre.

It is believed that the present invention would also be applicable where optical fibres are supporting higher order or many modes (i.e. so-called "multi-mode" fibres), although in that case the effect on the exiting beam shape may, e.g., be less easy to predict due to the multiple modes propagating in the fibre, and may depend more strongly on how the beam is launched, etc.

Although the present invention has been described with reference to light beams and rays, it will be appreciated that the present invention is applicable to any form of electromagnetic radiation that can propagate through an optical fibre. Thus references to light beams and rays also include, for example, infra-red and ultra-violet radiation, and are in particular not limited to visible light.

The present invention will now be described, by way of example only, and with reference to the accompanying drawings in which.

Figure 1:
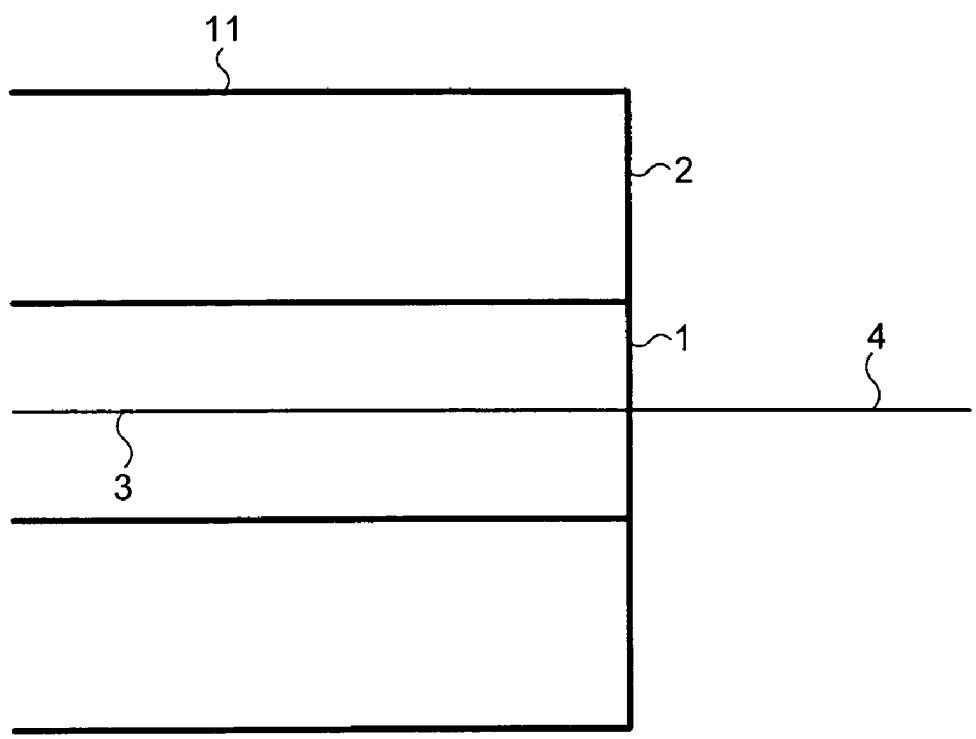
FIG. 1 shows a comparison between a conventional optical fibre and an optical fibre in accordance with the present invention using a simplified model of the light beam at the end face of the fibre.
Figure 1:
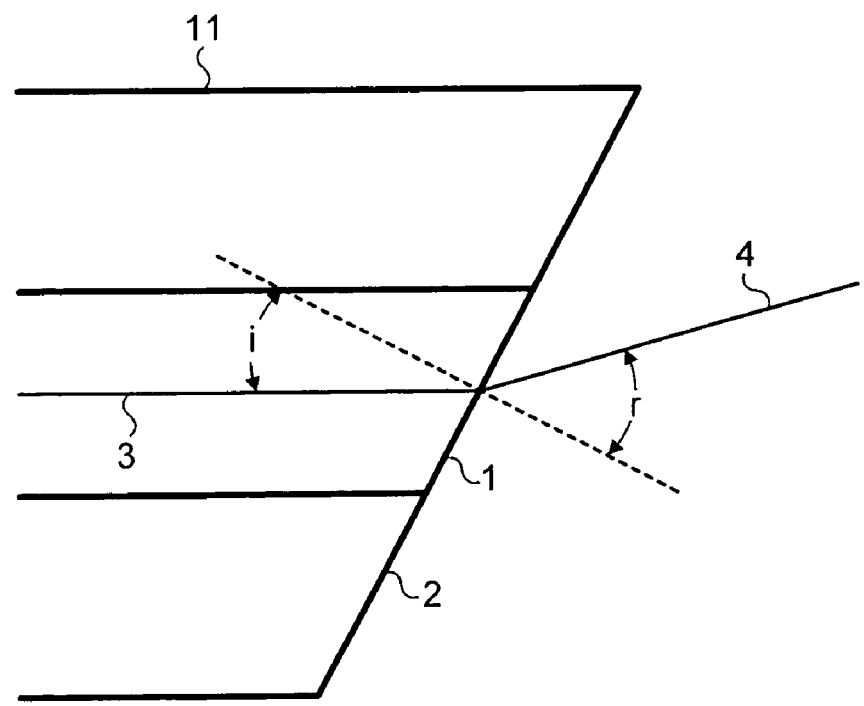

FIG. 1 illustrates a model that can be used to explain the present invention in which the light beam exiting an optical fibre 11 is considered to act as a single ray of light 3 which is illustrated as propagating within the optical fibre 11 along the longitudinal axis of the optical fibre. The optical fibre 11 comprises a fibre core 1 surrounded by a layer of cladding 2.

The upper portion of FIG. 1 shows a conventional optical fibre in which the end face of the fibre lies in a plane that is generally perpendicular to the longitudinal axis of the optical fibre. The lower portion of FIG. 1 shows an optical fibre 11 in accordance with the present invention. The end face of this fibre is cut and polished in a plane that is angled with respect to a plane perpendicular to the longitudinal axis of the optical fibre.

In the conventional optical fibre shown in the upper portion of FIG. 1, the light ray 3 passes along the longitudinal axis of the optical fibre until it encounters the end face of the optical fibre which defines a glass:air interface. The angle of incidence of the light ray 3 at this interface is zero and therefore, in accordance with Snell's law, the angle of refraction of the light ray 4 which exits the fibre is zero. Thus the light ray passes through the end face of the fibre undeviated.

In the optical fibre with an angled end face shown in the lower portion of FIG. 1, the light ray 3 strikes the glass:air interface at an angle of incidence i (measured to a line perpendicular to the plane of the glass:air interface). In accordance with Snell's law, the light ray 4 that exits the optical fibre is refracted and continues at an angle of refraction r (again measured to a line perpendicular to the plane of the glass:air interface). The extent of deviation of the refracted light ray is determined by the angle of the end face and by the ratio of the refractive indices of the glass of the optical fibre core 1 and of the surrounding air.

Figure 2:
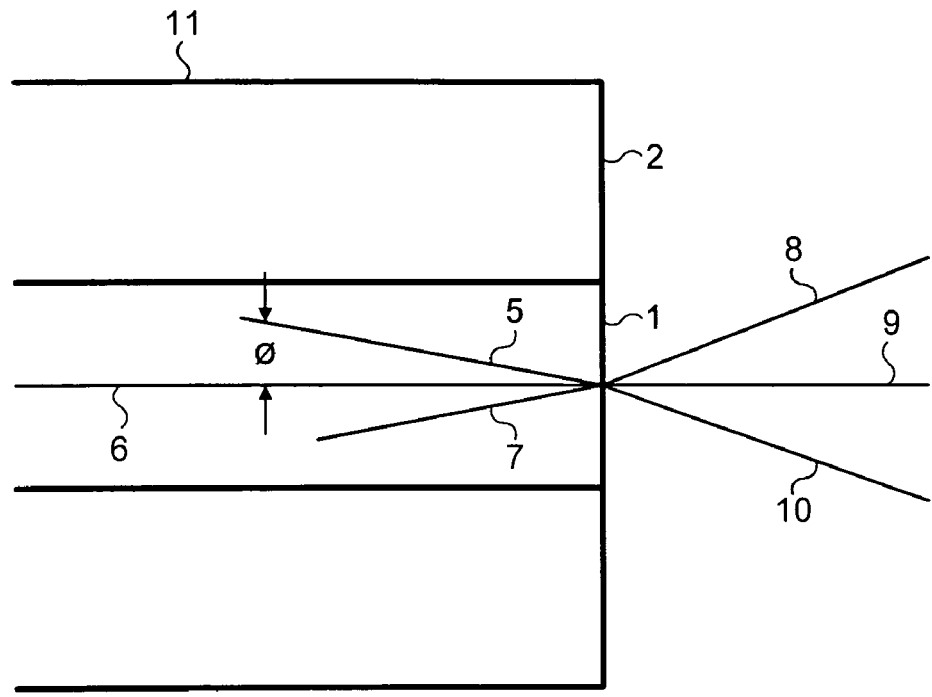
FIG. 2 shows a similar comparison to that shown in FIG. 1 but with a more realistic model of the light beam at the end face of the fibre.
Figure 2:
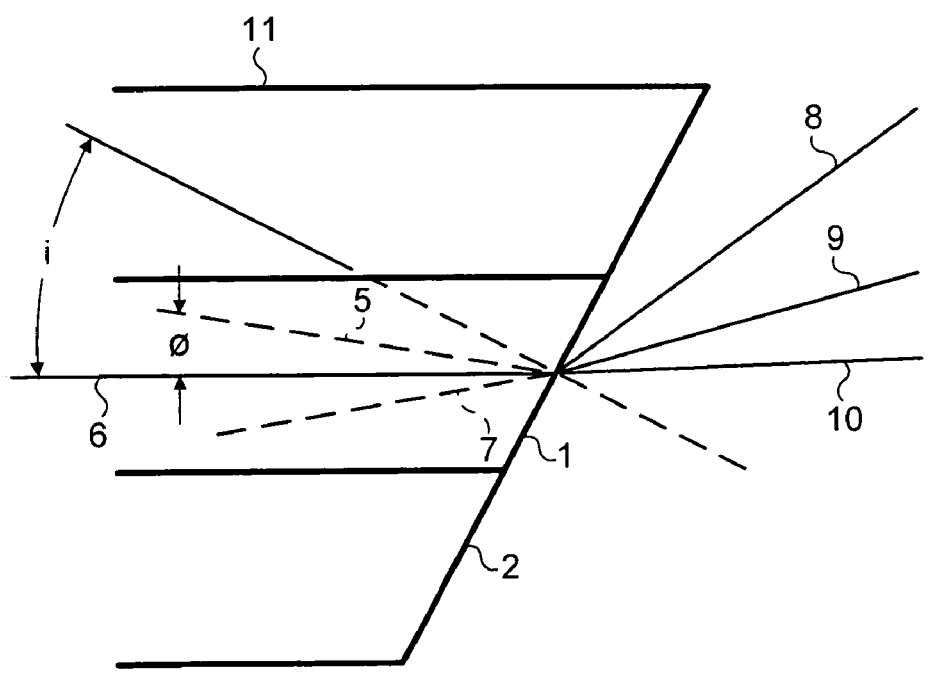

FIG. 2 illustrates the same general principle shown in FIG. 1 but with a more realistic model of the light beam carried by the optical fibre. The light beam is illustrated as comprising three light rays 5, 6 and 7 which include lights rays 5 and 7 that are not parallel to the longitudinal axis of the optical fibre. Whilst within the optical fibre, light rays 5 and 7 will repeatedly encounter the internal interface between fibre core 1 and the fibre cladding 2 at which point they undergo total internal reflection. Thus light rays 5 and 7 of the light beam effectively bounce back and forth within the fibre core as they propagate along the length of the optical fibre.

As shown in the upper portion of FIG. 2, in a conventional optical fibre when the light beam encounters the glass:air interface at the end face of the fibre, the angle of incidence of the light ray 6 at the interface is zero (and hence it passes through undeviated as light ray 9). Light rays 5 and 7 strike the interface at angles of incidence +ø and −ø, respectively, and are consequently refracted to exit the optical fibre as light rays 8 and 10 respectively. However, since the end face is perpendicular to the longitudinal axis of the optical fibre, any distortion of the light beam caused by refraction is symmetrical around the axis of the fibre and so the shape of the light beam is maintained as it exits the fibre. Thus a non-circular light beam remains non-circular and a circular light beam remains circular.

The lower portion of FIG. 2 illustrates the effect of an angled end face on the light beam as it exits the fibre 11. In this fibre all of the light rays 5, 6 and 7 strike the glass:air interface at an angle (i+ø, i, i−ø, respectively) and are refracted to follow paths 8, 9 and 10 respectively. The result of this is that the light beam is dispersed and its cross-section is distorted. This is illustrated in more detail in FIG. 3.

FIG. 3 again shows in its upper portion the arrangement for a conventional optical fibre where when the light beam encounters the glass:air interface at the end of the fibre, the on-axis light ray 3 at least passes through the glass:air interface undeviated as the angle of incidence is 0°. It should also be noted in this arrangement that the optical axis of the exiting light beam is parallel to the longitudinal axis of the optical fibre.

Figure 3:
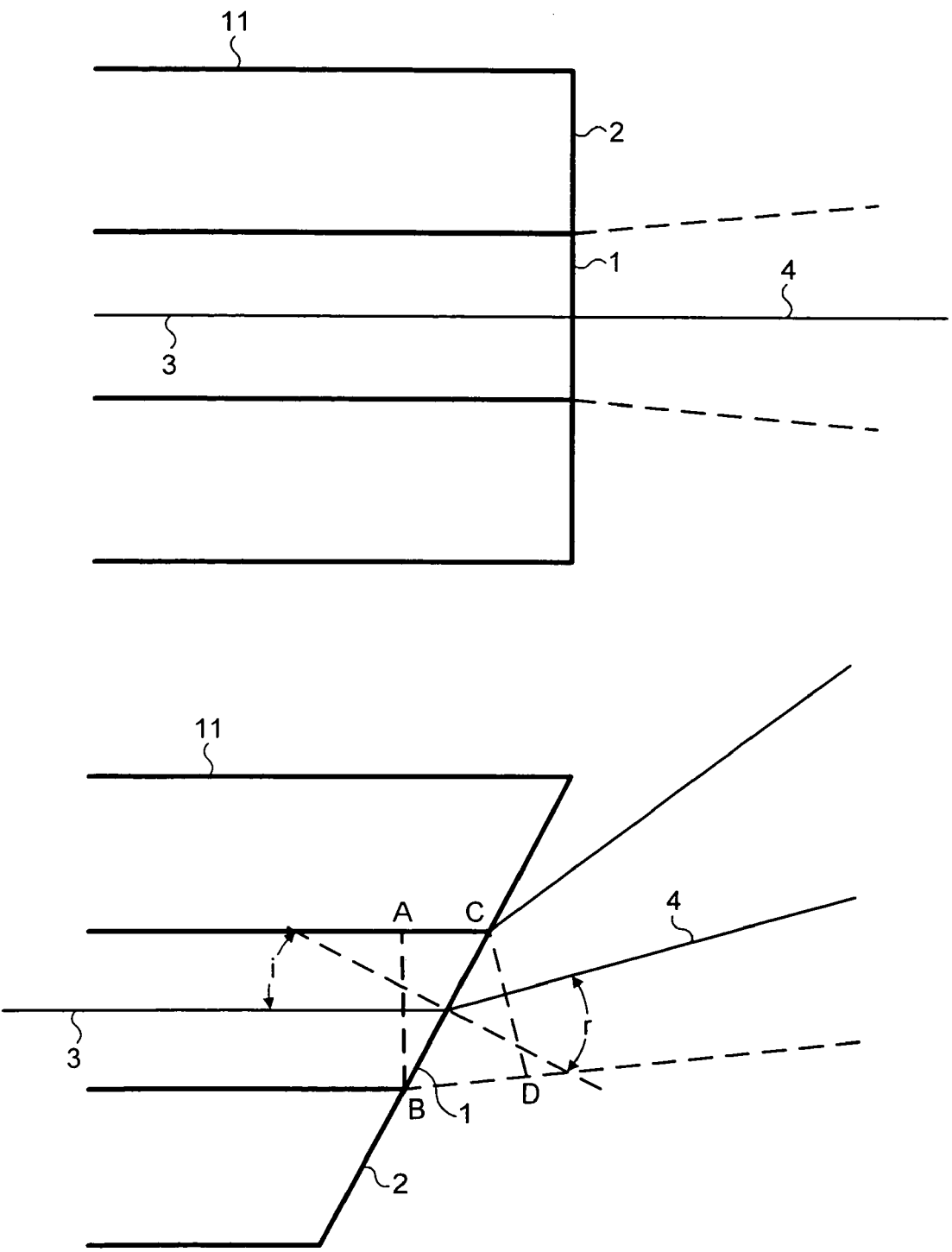
FIG. 3 shows another comparison to that shown in FIG. 1 and illustrating the effect of the present invention.

The lower portion of FIG. 3 shows the effect of an angled end face on the light beam as it exits the fibre 11. In this case, as discussed above, the light rays and hence beam are deviated in accordance with Snell's law when they strike the glass:air interface.

The refraction of the light beam at the angled fibre end face has a number of effects on the light beam as it exits the fibre. Firstly, as can be seen from FIG. 3, the on-axis ray (chief ray) 3 propagating in the optical fibre core is refracted such that it travels in a different direction on exiting the fibre. Thus the optical axis 4 of the exiting light beam (the direction of the chief ray) is no longer parallel to the longitudinal axis of the optical fibre. (This may need to be taken into account when coupling the exiting light beam to further optical components, since, where necessary, those components should be aligned appropriately with the optical axis of the exiting light beam (which may not be parallel to the longitudinal axis of the optical fibre).)

The refraction caused by the angled end face (air:glass interface) also affects the cross-section of the light beam. The core dimension AB shown in FIG. 3 is effectively "stretched" to the dimension BC when projected onto the sloping fibre end face. However, the effect on the fibre cross-section has to be considered in the plane perpendicular to the optical axis 4 of the exiting light beam, i.e. when the beam is viewed normal to its direction of propagation. This is the dimension CD shown in FIG. 3 (which is the projection of the fibre end face dimension BC onto a plane which is perpendicular to the optical axis 4 of the refracted (exiting) light beam). In fact this dimension CD is less than the dimension AB and so the refraction results in a net decrease in the beam cross-section along this axis. Therefore the effect of the angled fibre end is that the dimension of the exiting light beam generally aligned with the major axis of the angled end face (i.e. generally perpendicular to the minor axis of the angled fibre end face) is reduced as compared to when the beam is in the fibre.

Thus, by appropriately altering the angle of the fibre end face and orienting the major (and minor) axis of the slope of the end face with respect to the fibre (and/or beam in the fibre), the cross-sectional dimensions of the exiting light beam can be modified in a given direction to alter the cross-sectional circularity of an exiting light beam. For example, to increase the circularity of an exiting light beam, the angled fibre end face should be aligned such that the major axis of the sloping fibre end face is aligned with the major cross-sectional axis of the light beam in the fibre (i.e. perpendicular to the minor cross-sectional axis of the light beam in the fibre), as the overall effect will be to reduce the length of that major axis, and vice-versa.

Figure 4:
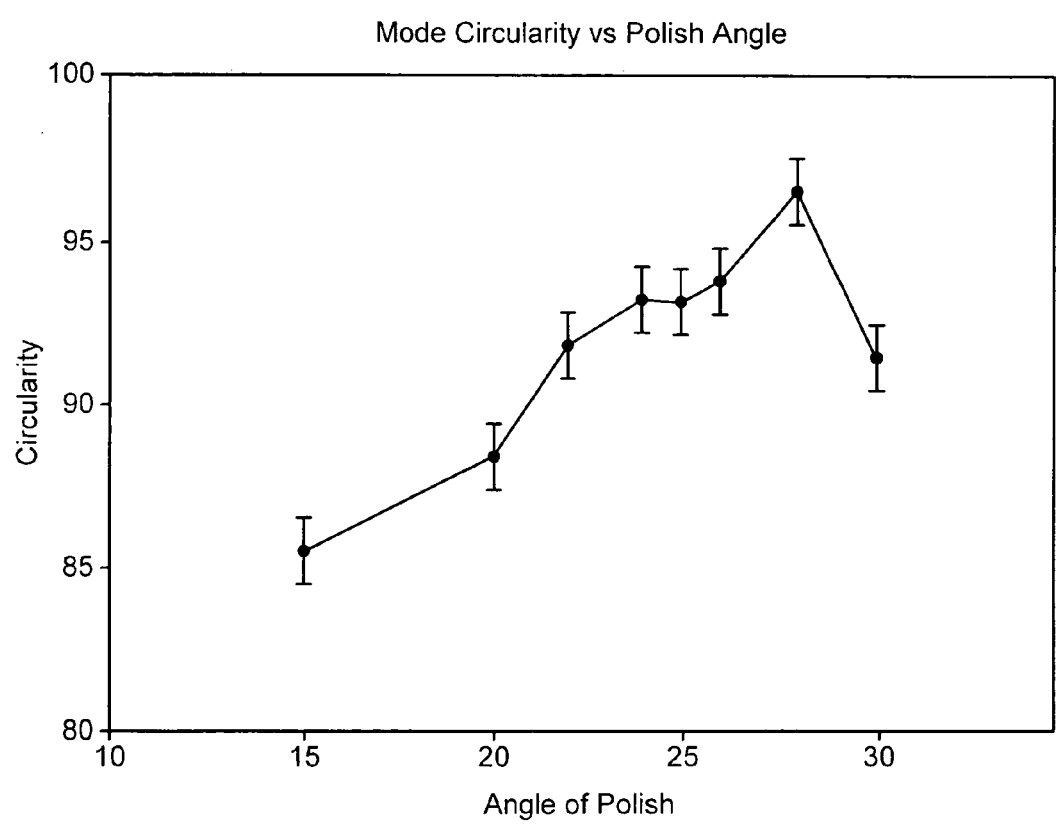
FIG. 4 shows a graph illustrating the effect on the cross-sectional circularity of a light beam of a range of angles of optical fibre end face.

FIG. 4 shows a graph illustrating how the circularity of a light beam exiting a single mode optical fibre has been found to vary over a range of angles of end face. The measure of circularity shown is taken as the ratio of the minor and major cross-sectional axes of the light beam. With its end face polished to zero degrees (i.e. perpendicular to the longitudinal axis of the fibre), the measured circularity of a light beam exiting the fibre was found to be 83°. As can be seen from FIG. 4, the circularity of the light beam exiting the fibre was increased by increasing the end face angle to obtain a maximum circularity of over 95% at an end face angle of approximately 28 degrees (as measured between the plane of the end face and a plane perpendicular to the optical axis of the fibre). At angles greater than around 28 degrees the circularity decreases but it is still greater than for the unmodified fibre.

As will be appreciated by those skilled in the art, the end face or faces of the fibre can be processed in ways other than polishing to angle it appropriately, if desired. For example, the fibre could be cleaved, ultrasonically machined, or sculpted with a laser to provide an appropriately angled planar end face.

Whilst the present invention has been described with reference to preferred embodiments, it will be apparent to those skilled in the art that various changes can be made in form and detail without departing from scope of the invention.

The invention claimed is:

1. A method of processing an optical fibre, comprising:
    determining the circularity of a light beam exiting the optical fibre; and
    processing an end face of the optical fibre core to cause it to lie at an angle to a plane perpendicular to the longitudinal axis of the fibre on the basis of the determined circularity of a light beam exiting the fibre such that the circularity of a light beam exiting the fibre through that end face is altered.

2. The method of claim 1, comprising:
    processing an end face of the optical fibre core to cause it to lie at an angle to a plane perpendicular to the longitudinal axis of the fibre on the basis of the determined circularity so as to increase the cross-sectional circularity of a light beam exiting the fibre through that end face as compared to the cross-sectional circularity of the light beam when it is in the fibre.

3. The method of claim 1, comprising processing an end face of the optical fibre core such that the minor axis of the angled end face of the fibre core is generally aligned with the minor axis of the beam cross-section in the fibre.

4. The method of claim 3, comprising processing an end face of the optical fibre core such that the minor axis of the angled end face of the fibre core is substantially parallel to the minor cross-sectional axis of the light beam in the fibre.

5. The method of claim 1, comprising:
    processing an end face of the optical fibre core to cause it to lie at an angle to a plane perpendicular to the longitudinal axis of the fibre on the basis of the determined circularity to decrease the cross-sectional circularity of a light beam exiting the fibre through that end face as compared to the cross-sectional circularity of the light beam when it is in the fibre.

6. The method of claim 1, comprising processing an end face of the optical fibre core such that the major axis of the angled end face of the fibre core is generally aligned with the minor axis of the beam cross-section in the fibre.

7. The method of claim 6, comprising processing an end face of the optical fibre core such that the major axis of the angled end face of the fibre core is substantially parallel to the minor cross-sectional axis of the light beam in the fibre.

8. The method of claim 1, comprising processing an end face of the optical fibre core such that the angle between the plane of the angled end face of the optical fibre core and a plane perpendicular to the longitudinal axis of the optical fibre is at least 15 degrees.

9. The method of claim 8, comprising processing an end face of the optical fibre core such that the angle between the plane of the angled end face of the optical fibre core and a plane perpendicular to the longitudinal axis of the fibre is 15 to 45 degrees.

10. The method of claim 1, comprising:
processing one end face of the fibre core such that it lies at a first angle to a plane perpendicular to the longitudinal axis of the fibre; and
processing the other end face of the fibre core such that it lies at a second angle to a plane perpendicular to the longitudinal axis of the fibre.

11. The method of claim 10, wherein the first and second angles are the same.

12. The method of claim 10, wherein the first and second angles are different.

13. The method of claim 12, wherein one end face of the fibre is substantially perpendicular to the longitudinal axis of the fibre and the other end face is at a different, sloping, angle.

14. The method of claim 10, wherein the end faces of the optical fibre are not perpendicular to the longitudinal axis of the fibre.

15. The method of claim 10, wherein the major axes of the end faces of the fibre core are substantially parallel.

16. The method of claim 10, wherein the major axis of the end faces of the fibre core are not substantially parallel.

17. The method of claim 1, further comprising:
determining the circularity of a light beam intended to be input to the optical fibre; and
processing an end face of the optical fibre core to cause it to lie at an angle to a plane perpendicular to the longitudinal axis of the fibre on the basis of the determined circularity of the light beam intended to be input to the optical fibre.

18. The method of claim 17, further comprising:
determining the circularity the light beam will have when it is in the optical fibre; and
processing an end face of the optical fibre core to cause it to lie at an angle to a plane perpendicular to the longitudinal axis of the fibre on the basis of the determined circularity of the light beam intended to be input to the optical fibre and on the basis of the determined circularity that the light beam will have when it is in the optical fibre.

19. The method of claim 1, comprising:
processing the ends of the fibre core to cause them to lie at angles such that the optical fibre can provide a non-circular cross-sectioned light beam output from one end of the fibre and a substantially circular cross-sectioned light beam output from the other end of the fibre.

20. The method of claim 8, comprising processing an end face of the optical fibre core such that the angle between the plane of the angled end face of the optical fibre core and a plane perpendicular to the longitudinal axis of the fibre is 20 to 35 degrees.

21. The method of claim 8, comprising processing an end face of the optical fibre core such that the angle between the plane of the angled end face of the optical fibre core and a plane perpendicular to the longitudinal axis of the fibre is 25 to 30 degrees.

22. A method of processing an optical fibre, comprising:
processing one end face of the optical fibre core such that it lies at a first angle to a plane perpendicular to the longitudinal axis of the fibre to alter the circularity of a light beam exiting the optical fibre via the one end face; and
processing the other end face of the optical fibre core such that it lies at a second angle to a plane perpendicular to the longitudinal axis of the fibre.

23. The method of claim 22, wherein the first and second angles are the same.

24. The method of claim 22, wherein the first and second angles are different.

25. A method of processing an optical fibre, comprising:
processing the generally planar ends of the fibre core to cause them to lie at angles such that the optical fibre can provide a substantially circular cross-sectioned light beam output from one end of the fibre and a non-circular cross-sectioned light beam output from the other end of the fibre.

26. A method of processing an optical fibre, comprising:
determining the circularity of a light beam intended to be input to the optical fibre;
determining the circularity the light beam will have when it is in the optical fibre; and
processing an end face of the optical fibre core to cause it to lie at an angle to a plane perpendicular to the longitudinal axis of the fibre on the basis of the determined circularity of the light beam intended to be input to the optical fibre and on the basis of the determined circularity that the light beam will have when it is in the optical fibre.

27. A method of processing an optical fibre having a fibre core which will carry a non-circular cross-sectioned light beam, comprising:
processing a generally planar end face of the optical fibre core to cause it to lie at an angle greater than 15 degrees relative to a plane perpendicular to the longitudinal axis of the fibre to alter the circularity of a light beam exiting the fibre.

28. A method of adjusting the circularity of a light beam emitted from an optical fibre, comprising:
determining the natural degree of cross-sectional circularity of a light beam carried by the optical fibre;
determining the degree of slope of the an face of the fibre core required to obtain a desired degree of cross-sectional circularity in a light beam emitted from the optical fibre through that end face; and
processing the end face of the optical fibre core to obtain the determined degree of slope of the end face and the desired degree of cross-sectional circularity in a light beam emitted from the fibre through that end face.

* * * * *